United States Patent
Rizzi

(10) Patent No.: US 10,449,504 B2
(45) Date of Patent: Oct. 22, 2019

(54) TUBE ISOTHERMAL CATALYTIC REACTOR

(71) Applicant: Casale SA, Lugano (CH)

(72) Inventor: Enrico Rizzi, Casnate con Bernate (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 15/748,010

(22) PCT Filed: Jul. 7, 2016

(86) PCT No.: PCT/EP2016/066102
§ 371 (c)(1),
(2) Date: Jan. 26, 2018

(87) PCT Pub. No.: WO2017/016838
PCT Pub. Date: Feb. 2, 2017

(65) Prior Publication Data
US 2019/0009237 A1    Jan. 10, 2019

(30) Foreign Application Priority Data

Jul. 29, 2015 (EP) .................................. 15178795

(51) Int. Cl.
*B01J 8/02* (2006.01)
*B01J 8/00* (2006.01)

(52) U.S. Cl.
CPC ............ *B01J 8/0214* (2013.01); *B01J 8/008* (2013.01); *B01J 8/025* (2013.01); *B01J 8/0257* (2013.01); *B01J 8/0285* (2013.01); *B01J 2208/00132* (2013.01); *B01J 2208/00884* (2013.01)

(58) Field of Classification Search
CPC ... B01J 8/0214; B01J 8/02; B01J 8/008; B01J 8/025; B01J 8/0257; B01J 8/0285
USPC ....................................................... 422/198
See application file for complete search history.

(56) References Cited

U.S. PATENT DOCUMENTS

| 6,955,792 B2 | 10/2005 | Filippi et al. |
| 2017/0028373 A1 | 2/2017 | Filippi et al. |

FOREIGN PATENT DOCUMENTS

| EP | 2 246 109 A1 | 11/2010 |
| RU | 2362618 C1 | 7/2009 |

OTHER PUBLICATIONS

International Search Report dated Oct. 14, 2016 in connection with PCT/EP2016/066102.
International Preliminary Report on Patentability dated Nov. 24, 2017, in connection with PCT/EP2016/066102.
Written Opinion of the International Searching Authority dated Oct. 14, 2016, in connection with PCT/EP2016/066102.

*Primary Examiner* — Huy Tram Nguyen
(74) *Attorney, Agent, or Firm* — Akerman LLP

(57) ABSTRACT

Vertical reactor (1) for chemical reactions, comprising a tube heat exchanger (6) immersed in a catalytic bed (5), wherein said tube exchanger (6) comprises a plurality of straight tube bundles (6.1, 6.2) with respective tube plates for feeding (9.1, 9.2) and collecting (10.1, 10.2) the heat exchange fluid, and wherein the tube bundles and the respective tube plates are vertically staggered so as to allow access to the shell side.

7 Claims, 3 Drawing Sheets

TUBE ISOTHERMAL CATALYTIC REACTOR

This application is a national phase of PCT/EP2016/066102, filed Jul. 7, 2016, and claims priority to EP 15178795.9, filed Jul. 29, 2015, the entire contents of both of which are hereby incorporated by reference.

FIELD OF APPLICATION

The invention relates to a chemical reactor containing a catalytic bed and a tube heat exchanger immersed in the bed. Such a reactor is also called tube isothermal reactor and is used for example for the synthesis of methanol.

BACKGROUND

A tube isothermal reactor essentially comprises an outer shell, a suitable drum containing the catalytic bed, a tube bundle, one or two tube plates for U-shaped or straight tubes, respectively. In radial or axial-radial flow embodiments, the catalytic bed has an annular structure essentially defined by two coaxial cylindrical walls, termed inner collector and outer collector; as a consequence, the tube bundle also has an annular structure.

The tubes are fed with a heat exchange fluid, for example water or steam, which releases or removes heat from the bed, allowing the temperature of the bed itself to be controlled. For this reason the reactor is also defined isothermal. For example, in reactors for the methanol synthesis, the chemical reaction is exothermal and the tube bundle is typically passed through by boiling water.

Basically, the reactor has a shell side which contains the catalyst and is passed through by reagents and reaction products, usually gaseous, and a tube side (inside of the tubes) passed through by said heat exchange fluid. It should be noted that the catalyst becomes exhausted over the time and must be periodically unloaded to be regenerated or replaced with fresh catalyst, which requires access to the shell side of the reactor.

It is known that the tube plates are a costly item in reactors of this type. Said plates are in the form of a disk or ring with an outer diameter substantially equal to the diameter of the reactor; they have a considerable thickness in order to withstand pressure and, consequently, require a large quantity of high-quality material (alloyed steel). Moreover conventional tube plates make the access to the shell side of the reactor difficult for loading and unloading the catalyst, which results in these operations being time-consuming and expensive.

In order to eliminate the above costly item, tube isothermal reactors have been proposed where the tube plates are replaced by a first body acting as a fluid distributor and by a second body acting as a collector, the ends of the tubes being welded to said first and second body. Said bodies have for example a toroidal, spherical, cylindrical or ellipsoidal shape and are smaller than the cross-section of the apparatus so as to allow the loading and unloading of the catalyst.

The distributor and the collector so realized are lighter and less costly than a tube plate, however they give rise to a series of drawbacks.

A first drawback is that the tubes, which are regularly and uniformly distanced (e.g. square or triangular configuration) in the central part of the bundle, must be arranged close to each other in proximity of the distributor body and the collector body, resulting in each single tube having one or more bends at its ends; these bends are all different from each other, depending on the radial position of the tube inside the reactor. This feature poses a number of problems from the point of view of the constructional design and requires special bending machines to obtain precise and repeatable geometrical forms.

Another problem is that the engagement of the tubes on the aforementioned bodies occurs in directions perpendicular to the surfaces of said bodies, which generally do not coincide with the axis of the tubes. In order to mount the tubes within the limited space available during the assembly of the apparatus, it is therefore necessary to provide, at least at one end of each tube, an intermediate joint between the shaped end and the straight part. This increases the costs and gives rise to possible leakage points.

A leakage due to a welding defect of one of these intermediate joints would be very difficult to detect, and cannot be repaired owing to the large number of tubes close to each other. Basically the only solution is to seal the damaged tube.

As mentioned above, the distributor body and the collector body are smaller than the cross-section of the apparatus so as to allow the inflow/outflow of catalyst during loading/unloading thereof. However, the closer arrangement of the tubes around said bodies constitutes an obstacle for the outflow of the catalyst and partly cancels the advantage obtained. Moreover the ends of the various tubes, which are all different in terms of path, height and length, hinder the correct distribution of the heat exchange fluid on the tube side, introducing non-uniform head losses; consequently the flow inside the tubes may not be uniform and some tubes in the bundle may have a reduced cooling or heating capacity. All this constitutes a drawback for the process.

Where the tubes deviate from the straight and parallel configuration, owing to the curved ends, zones are inevitably created where the tubes are arranged closer to each other or are spaced apart with respect to the design layout; these zones are undesired non-standard features giving poor contribution to heat exchange. For this reason, said tube ends, although extending lengthwise inside the apparatus, are not taken into account when determining the heat exchange surface and therefore adversely affect the filling coefficient of the apparatus, i.e. the useful exploitation of its internal volume.

These drawbacks may significantly reduce the cost savings achieved by using the aforementioned collectors and distributors instead of the tube plates.

In order to solve the problem of accessibility to the shell side (hindered by the tube plates) it has also been proposed reducing the dimensions of said plates, i.e. for example using plates having a cross-section which is substantially smaller than the bed. This solution, however, also requires bending of the tubes so as to cause them to converge onto the plate section, with the added drawback that, compared to the situation described above, they require even a double bend for each end. In addition to the cost aspects already mentioned above, it should be noted that the minimum distance between the tubes is present in the region of the tube plate, which means that it is necessary to use a bundle of tubes which are relatively spaced from each other along the reactor, and therefore apparatuses with very densely occupied exchange surfaces cannot be obtained.

Basically, the prior art does not offer yet a convenient solution for providing a low-cost tube isothermal reactor.

EP 2 246 109 discloses a tube isothermal chemical reactor with concentric ranks of tube packs.

SUMMARY OF THE INVENTION

The invention deals with the problem of how to provide a tube isothermal reactor at a lower cost with respect to the conventional technology, achieving at the same time a high degree of reliability, avoiding additional tube joining welds, and also providing easy access during loading and unloading of the catalyst when replacing the catalytic bed.

The objects are achieved with a reactor according to the attached claim 1. Preferred characteristic features are defined in the dependent claims.

The invention proposes providing a reactor containing a plurality of straight tube bundles, wherein each tube bundle has a respective tube plate for feeding the heat exchange fluid circulating in the tubes and a respective tube plate for collecting the same, and wherein at least some of the tube bundles and respective plates are arranged at different heights, thus being staggered vertically.

The reactor comprises a first set of tube bundles arranged at a first height inside the reactor and a second set of tube bundles arranged at a second height inside the reactor, the bundles of the first set and the second set being alternated so that each tube bundle is staggered with respect to the adjacent bundles. Consequently adjacent tube plates are also staggered vertically.

The different height of the plates, i.e. their vertically staggered arrangement, leaves free spaces between adjacent plates, which in turn define sections for accessing the shell side of the exchanger. These sections may be used for loading the fresh catalyst and for unloading the exhaust catalyst.

Advantageously, the tube plates cover the entire cross-section of the catalytic bed, since the space for accessing the shell side and for the passage of the catalyst is ensured by the vertical deviation. The tube plates are shaped in the form of circular sectors or ring sectors, depending on the configuration of the bed.

Each one of said circular sectors or ring sectors extends substantially along the full radial extension of said catalytic bed. In other words, each sector of tube plate has the same or substantially the same radial extension as the catalytic bed and, consequently, there is only one sector in the radial direction. For example, each sector of tube plate extends substantially from an inner collector to an outer collector of the catalytic bed.

Preferably the tube bundles are identical to each other and in particular all the tubes of the bundle are straight and parallel and have the same length.

The invention basically proposes performing heat exchange with a modular tube bundle. Instead of a single bundle with monolithic tube plates which occupy the entire cross-section of the bed (as in the prior art), the invention uses a plurality of bundles with respective smaller-size plates, which are for example formed as sectors or "petals", and uses the expedient of staggering the bundles and the plates vertically, so as to leave space enough for outflow of the catalyst.

The preferred applications of the invention comprise the construction of: methanol synthesis reactors, ammonia synthesis reactors, shift reactors for the purification of a synthesis gas, for example in the hydrogen generating plants or in the front end of an ammonia plant.

The invention offers the great advantage of simplifying the access to the shell side through the free spaces between the vertically staggered plates. At the same time, the invention allows the use of flat tube plates, simplifying the welding of the tubes to said plates. The ends of the straight tubes may be welded directly to the plates without tube sections and without folding or bending the tubes. The drawbacks of the prior art, which have been listed further above, are thus overcome by the invention.

The advantages of the invention will emerge even more clearly with the aid of the detailed description below relating to a number of preferred embodiments.

DETAILED DESCRIPTION

Figure 1:
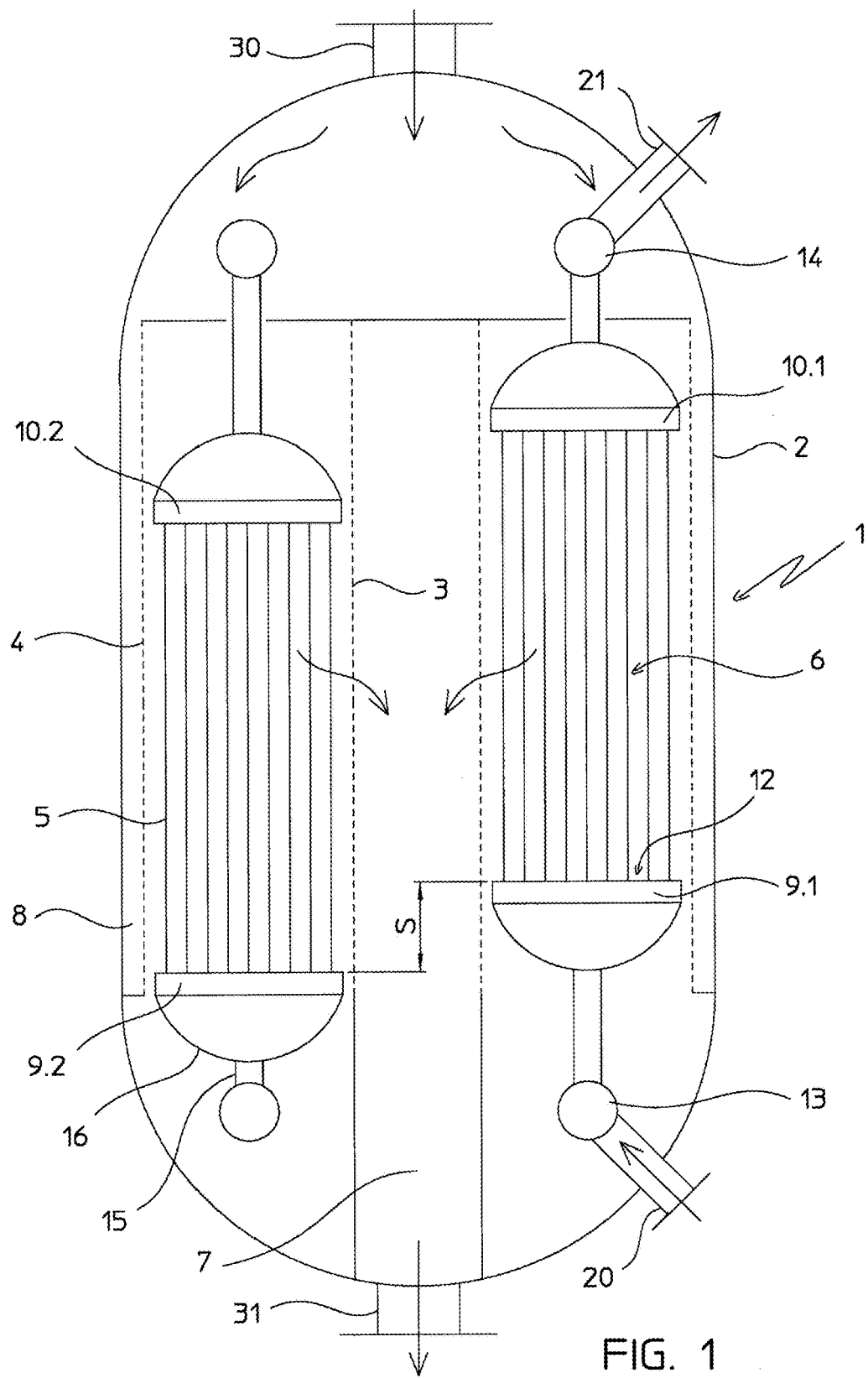
FIG. 1 shows in schematic form a tube reactor according to an embodiment of the invention.

FIG. 1 shows the main parts of a vertical reactor 1 according to an embodiment of the invention. The reactor 1 comprises: a shell 2; coaxial and perforated cylindrical walls which form an inner collector 3 and an outer collector 4. The space between the two collectors 3 and 4 contains a catalytic bed 5 and a tube heat exchanger denoted overall by the reference number 6. Said heat exchanger 6 is immersed in the bed 5.

The example relates to a centripetal axial-radial or radial flow reactor, in which the reagents, fed via the inlet 30, enter the catalytic bed 5 through the space 8 around the outer collector 4, and the reaction products are collected inside the central tube 7 and exit through the outlet flange 31.

The reactor according to FIG. 1 is therefore of the radial or axial-radial flow type (depending on the direction the bed 5 is passed through) which constitutes a particularly advantageous application; it is however possible to apply the configuration of the invention also to an axial reactor and in this case the reactor does not comprise the collectors 3 and 4.

The heat exchanger 6 is fed with a heat exchange fluid, entering at 20 and exiting at 21, which controls the temperature of the catalytic bed 5. For example, reference is made to an exothermal reactor wherein the heat exchanger 6 exports heat from the bed, and the fluid is water which is fed to the bottom and which evaporates along the tubes, emerging in the form of steam from the top of the bundle. Due to this operating mode, such a reactor is also called "steam raising" reactor.

The heat exchanger 6 comprises a plurality of tube bundles, with respective tube plates, which are vertically staggered as can be noted from the figures. The figures show a first bundle 6.1 with tube plates 9.1 and 10.1 and a second bundle 6.2 with tube plates 9.2 and 10.2. The bundle 6.1 is located at a first height inside the reactor 1, while the bundle 6.2 is located at a second height; consequently, the bundles and the tube plates are staggered by a distance s (FIG. 3) defining spaces 11 and 11' between adjacent plates.

Figure 3:
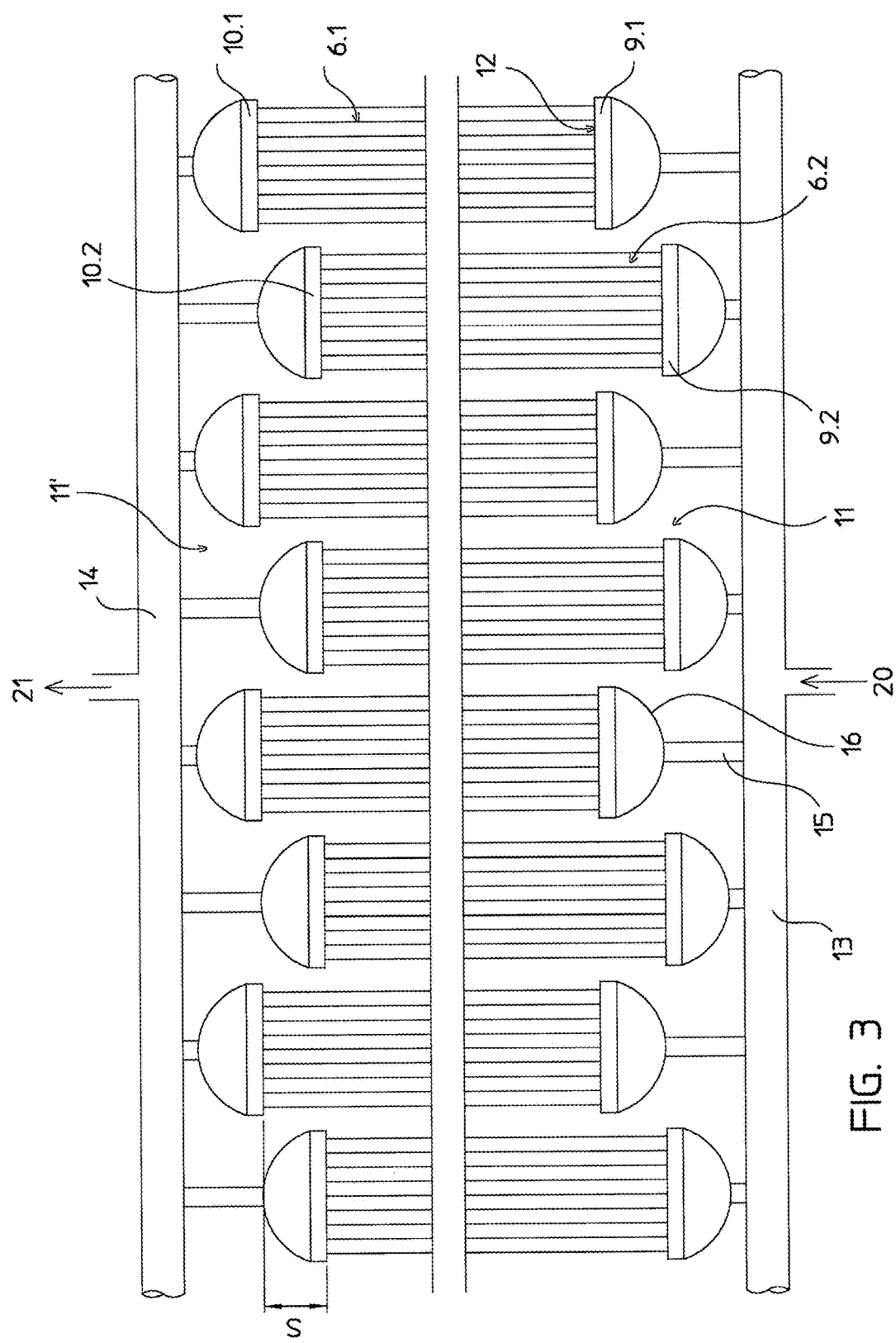
FIG. 3 shows a planar expansion of the longitudinal section of the heat exchanger of the reactor according to FIG. 1.

As can be noted in particular in FIG. 3, there are alternated bundles which are situated at a first height (such as the bundle 6.1) and at a second height (such as the bundle 6.2). It should also be noted that the surface 12 of the plates is advantageously flat. In this way, the ends of the straight tubes may be easily welded to the plates.

The tube bundles communicate with a common feed distributor 13 (water inlet) and with a common steam collector 14 (steam outlet). Each plate communicates with the distributor 13 or the collector 14, preferably via a duct 15 and a cover 16.

Figure 2:
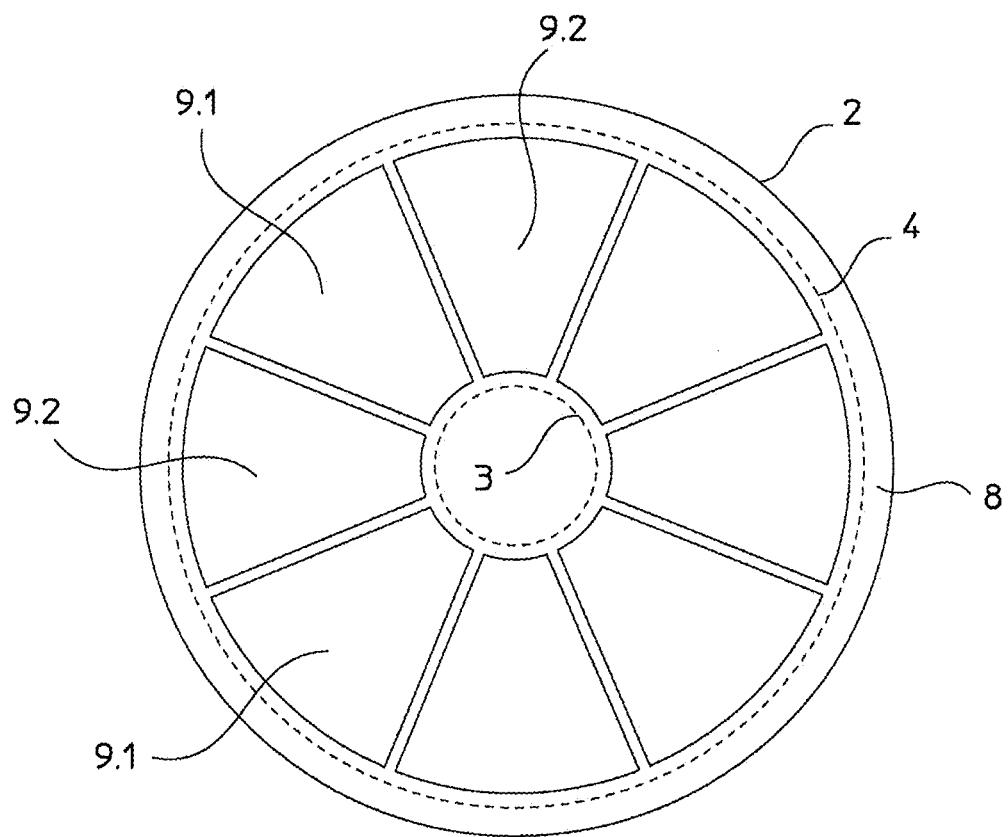
FIG. 2 is a schematic cross-section of the reactor according to FIG. 1.

A preferred embodiment of the tube plates 9.1 and 9.2 is illustrated in FIG. 2, wherein said tube plates are shaped as ring sectors. A single tube plate, for example the plate 9.1, occupies a sector of the ring defined between the walls 3 and 4, substantially corresponding with the cross-section of the catalytic bed 5.

From FIG. 2 it can be noted that the tube plates cover the entire cross-section of the catalytic bed 5 and consequently, even though ordinary straight tubes are used, it is possible to distribute the tubes within the catalytic bed in a substantially uniform manner. Also, each sector of plate has substantially the same radial extension as the catalytic bed going from the inner collector 3 to the outer collector 4.

This results in better use of the reactor volume and improved and more uniform control of the process, in particular of the reactor temperature. Nevertheless, the shell side (i.e. the space containing the catalyst) is accessible via the passages 11 and 11', which are not visible in FIG. 2, but which allow the catalyst to be easily loaded and unloaded. The passages 11' in the top part of the reactor allow the loading of the catalyst, while the passages 11 in the bottom part are intended for unloading.

The fluid collection plates 10.1 and 10.2 are shaped and arranged in a similar manner and as shown by way of example in FIG. 2.

The invention therefore achieves the objects described above.

The invention claimed is:

1. A vertical chemical reactor comprising at least a catalytic bed and a tube heat exchanger immersed in said catalytic bed and fed with a heat exchange fluid, wherein:
    said tube exchanger comprises a plurality of straight tube bundles, each tube bundle having a respective feed tube plate and a respective collection tube plate for the fluid,
    wherein said plurality of tube bundles comprises at least a first set of tube bundles arranged at a first height inside the reactor and a second set of tube bundles arranged at a second height inside the reactor, the bundles of the first set and the second set being alternated so that each tube bundle is staggered vertically with respect to the adjacent bundles,
    wherein said tube plates are shaped as circular sectors or ring sectors and each one of said sectors extend substantially along the full radial extension of said catalytic bed.

2. The reactor according to claim 1, wherein said tube plates have a surface of interface with the tubes, which is flat.

3. The reactor according to claim 1, wherein the free spaces between adjacent tube plates, due to the vertically staggered arrangement, define access points to the reactor zone containing the catalytic bed, which can be used for loading and unloading catalyst.

4. The reactor according to claim 1, wherein the tube plates, viewed in cross-section, cover the entire cross-section of the catalytic bed.

5. The reactor according to claim 1, wherein the tube bundles comprise straight tubes having the same length.

6. The reactor according to claim 1, wherein the catalytic bed has an essentially annular geometry being situated between two vertical and coaxial cylindrical walls, and the bed is crossed by a radial or axial-radial flow, and the tube plates are formed as ring sectors.

7. The reactor according to claim 1, for one of the following uses: methanol synthesis reactor, ammonia synthesis reactor, synthesis gas shift reactor.

* * * * *